United States Patent [19]

Scott et al.

[11] 4,456,219
[45] Jun. 26, 1984

[54] SPRING-LOCKING HANDLE MECHANISM

[75] Inventors: Daniel G. Scott, Swissvale; Gene S. Ferry, McKeesport, both of Pa.

[73] Assignee: American Standard Inc., Wilmerding, Pa.

[21] Appl. No.: 527,047

[22] Filed: Aug. 29, 1983

[51] Int. Cl.³ .................. F16K 35/02; F16K 31/60
[52] U.S. Cl. .................................. 251/99; 16/112; 16/DIG. 36; 74/504; 74/526; 74/523; 74/543; 251/243; 251/288
[58] Field of Search ............ 74/504, 526, 491, 523, 74/543; 16/112, DIG. 30, DIG. 36; 251/95, 98, 99, 107, 108, 109, 114, 115, 116, 242, 243, 244, 288; 267/158, 164

[56] References Cited

U.S. PATENT DOCUMENTS

| | | | |
|---|---|---|---|
| 538,317 | 4/1895 | Boynton | 251/243 |
| 1,509,816 | 9/1924 | Kendrick | 251/99 |
| 1,583,142 | 5/1926 | Hanrahan | 251/98 |
| 2,065,750 | 12/1936 | Safford | 251/99 |
| 2,147,287 | 2/1939 | Farmer | 251/109 |
| 2,855,154 | 10/1958 | Tyler et al. | 251/243 |
| 3,019,811 | 2/1962 | Young et al. | 251/243 |
| 3,184,212 | 5/1965 | Billeter | 251/288 |

Primary Examiner—George L. Walton
Attorney, Agent, or Firm—G. J. Falce

[57] ABSTRACT

A spring-locking handle mechanism in which a flat piece of spring stock is formed in a generally U-shaped configuration to provide a locking spring, one leg of which bears against the underside of the socket portion of a conventional two-piece locking handle, and the other leg of which bears downwardly on the upper surface of the handle portion. The spring legs must be spread apart in order to assemble the spring with the handle mechanism and are thus normally under tension, so that the handle portion is biased in its downward or locking position relative to the socket portion to discourage unintentional lifting. The width of the one leg corresponds to the distance between the depending locking lugs on the handle portion so as to fit snugly therebetween in both the locked and unlocked position of the handle. When the handle is raised to its unlocked position and then turned, the locking lugs engaging the sides of the one spring leg assure that the spring turns with the handle to maintain a spring load on the handle throughout the handle operating range of rotation.

26 Claims, 5 Drawing Figures

SPRING-LOCKING HANDLE MECHANISM

BACKGROUND OF THE INVENTION

This invention relates to locking handles for cocks and valves employed in air brake systems for railway trains and, particularly, to two-piece-type locking handles designed to discourage or protect against unintentional operation of the cocks.

Angle cocks are provided at the ends of railway car brake pipes, for example, to open the air connection between adjoining cars of the train and to close the air connection at the last car to thereby permit fluid pressure brake control at each car in the train by increasing and decreasing the brake pipe pressure from the locomotive at the head of the train.

In the event an angle cock intermediate the ends of the train is closed, the brake pipe pressure is cut off from the cars behind the closed angle cock, thereby rendering these cars absent of brake control. Also, closure of the angle cock at the head of the trail will prevent the increase and decrease of brake pipe pressure from being reflected throughout the entire length of train, so that the train is without any brake control whatsoever.

Conventional, two-piece locking handles have been designed to lock the handle against accidental movement from either an open or closed position. These self-locking or gravity lock handles are pivotally connected for operation in a vertical plane in which the handle is free to be raised from a locking position to an unlocked position. Locking lugs on the handle are free to clear stops on the housing in the raised position of the handle to permit rotational movement of the handle horizontally, and thereby effect opening and closing of the valve. This design relies upon the weight of the handle to maintain the handle in its lower locked position by gravity. The gravity lock design has been proven adequate through years of in-service operation. However, many railroads are now specifying a spring-locking handle. To date, any spring-locking handle design utilizing the detail parts long standard with the gravity lock design have not been economical to manufacture.

SUMMARY OF THE INVENTION

It is the object of this invention, therefore, to provide a locking-type handle that is simple and reliable in operation, and economical to manufacture.

These objectives are fulfilled by means of a flat spring bent in a substantially U-shaped configuration, with one leg having a widened portion with an opening therein. The opening is such as to allow the leg to fit over the valve stem and cover through which the valve stem projects. The socket portion of the locking handle is subsequently attached to the projecting valve stem. The other leg of the spring bears downwardly against the top of the locking handle with a certain degree of tension, while the one leg bears upwardly on the bottom surface of the handle socket. In this manner, the spring tension offers resistance to raising of the handle, thereby requiring a positive action to raise the handle sufficiently to unlatch it for rotation.

BRIEF DESCRIPTION OF THE DRAWINGS

Other objects and attendant advantages of the invention will appear in the following more detailed description when taken with the accompanying drawings in which.

DESCRIPTION AND OPERATION

Figure 1:
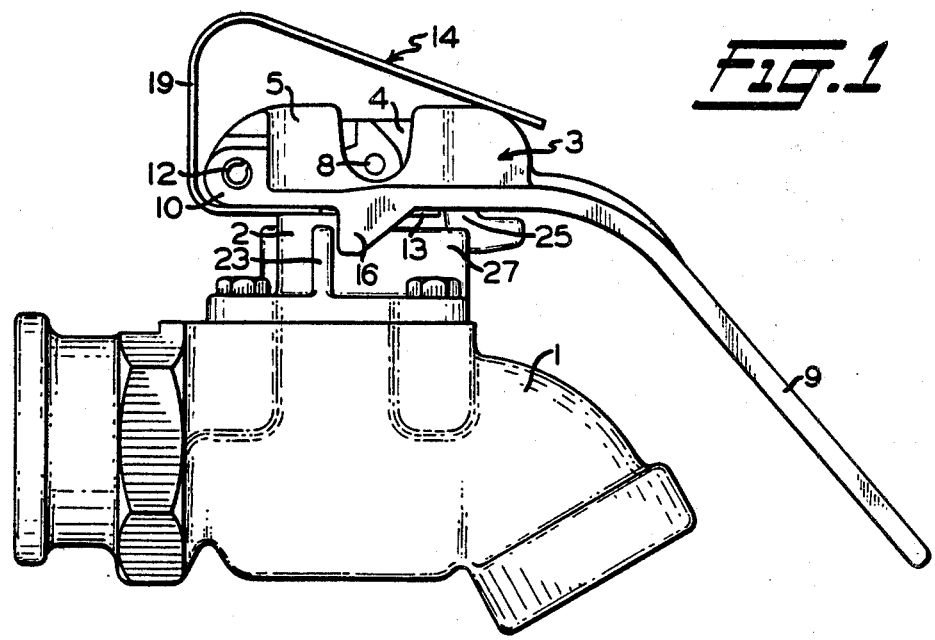
FIG. 1 is an elevation assembly view in outline showing an angle cock with the handle positioned so as to be normally locked against rotation.
Figure 2:
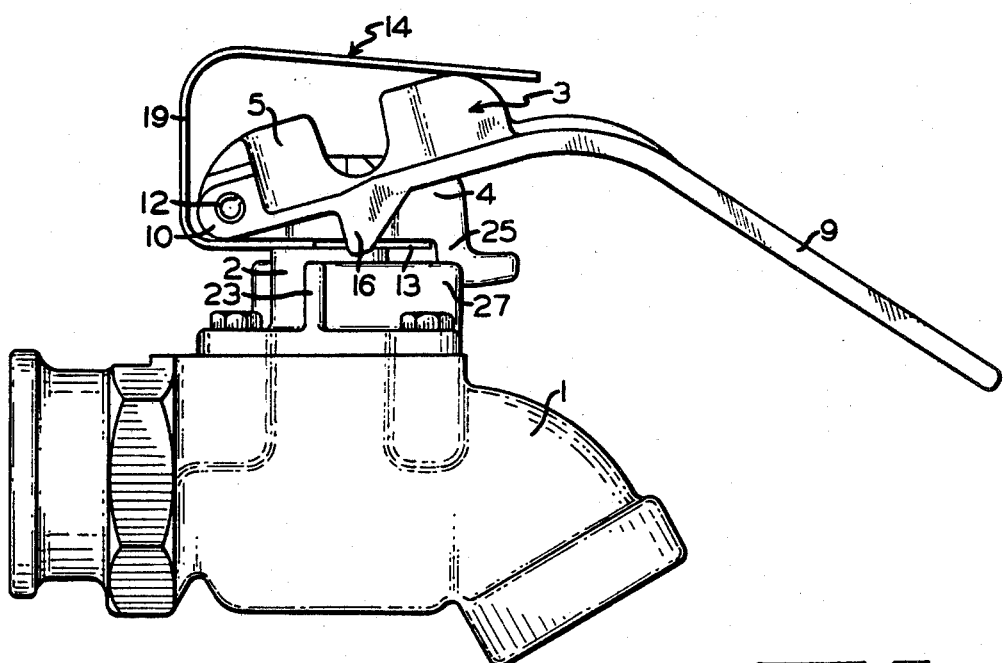
FIG. 2 is an elevation assembly view in outline showing an angle cock with the handle raised from its normal locked position so as to permit rotation.

A valve body 1 of an angle cock or other such valve device is provided with a generally circular-shaped cover 2 with which a locking-type handle mechanism 3 cooperates to permit operation of a valve member (not shown) to a selected open or closed position only when the handle is first lifted upwardly from its normal locked position to an operative or unlocked position.

Locking-type handle mechansim 3 is basically a conventional, two-piece-type handle including a socket portion 4 and a handle portion 5. The socket portion 4 has a square opening 6 to receive a correspondingly-shaped operating stem 7 of the angle cock valve member. Operating stem 7 works in a bore (not shown) that is contained in circular-shaped cover 2 of valve body 1. A pin 8 passes through the socket portion 4 and a groove in stem 7 to secure the socket portion axially on stem 7 in a position slightly above the top of cover 2 through which stem 7 projects.

Handle portion 5 is a hollow, circular body that surrounds socket portion 4 and has a handle lever 9 extending from one side and a bifurcated boss 10 directly opposite lever 9. A lug 11 of socket portion 4 is adapted to fit within the bifurcation of boss 10. By means of a pin 12 which passes through bifurcated boss 10 and lug 11, handle lever 9 may be pivotally operated in a vertical plane relative to socket portion 4. The pivotal connection provided by pin 12 permits raising and lowering handle portion 5 relative to socket portion 4 to establish the unlocked and locked position of the handle mechanism 3.

Interposed between socket portion 4 of the handle mechanism and the top of cover 2 is one leg 13 of a substantially U-shaped spring 14 formed from flat spring stock. The end 15 of spring leg 13 is of such enlarged width as to fit snugly within the space between a pair of oppositely disposed lugs 16 and 17, which depend from the circular body of handle portion 5 approximately 90° on either side of the handle lever 9. The sides of enlarged end 15 of leg 13 correspond in shape to the inside face of lugs 16 and 17, being normally straight. It is feasible, however, that the inside face of these lugs would be curved to match the curved configuration of the circular body of handle portion 5, in which case the sides of end 15 would be correspondingly curved. A circular opening 18 is formed in the enlarged end 15 of spring leg 13 through which the operating stem 7 of the angle cock valve member passes prior to fastening socket portion 4 to stem 7. The diameter of circular opening 18 is slightly larger than the circular-shaped cover 2 to permit the spring leg 13 to also fit over the cover, since the gauge of the spring stock is normally greater than the narrow space between the bottom of socket portion 4 and the top of cover 2. This permits rotation of the spring 14 with handle portion 5 relative to cover 2.

Figure 3:
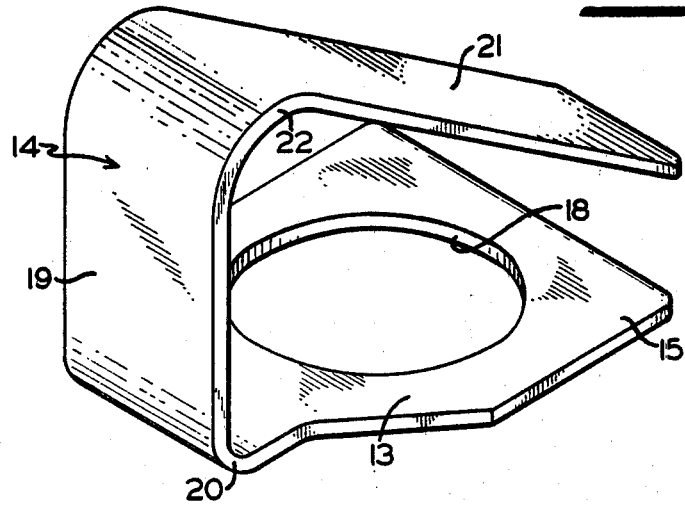
FIG. 3 is an isometric view of a spring device used with the locking handle to bias the handle in the normally locked position.
Figure 5:
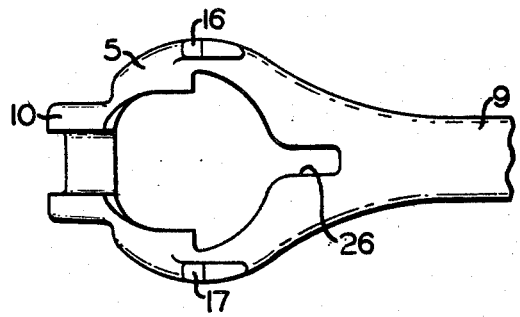
FIG. 5 is an outline view showing the underside of the handle.
Figure 4:
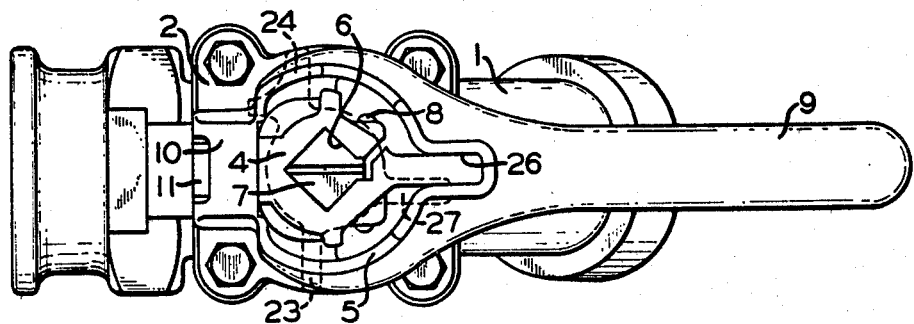
FIG. 4 is a plan view of FIG. 1, with the bias spring device broken away to better show the handle and socket connection with the valve member.

As shown in FIG. 3, a base 19 of the U-shaped spring 14 is formed by bending the spring stock at radius 20 so as to be substantially perpendicular to leg 13. The other leg 21 of spring 14 is formed at an angle with base 19 by means of a radius 22. The included angle at radius 22 is less than the angle at radius 20 such that, in the free state, leg 21 converges with leg 13. In its assembled condition, the bend at radius 20 between leg 13 and base 19 fits around the bifurcated boss 10 of socket portion 4, with leg 21 of spring 14 bearing against the upper surface of handle portion 7 at a point on the circular body surrounding socket portion 4. In this respect, leg 21 of spring 14 lies in line with handle lever 9 and acts as a leaf spring to maintain the handle lever under tension, by reason of leg 21 being deflected from its position in the free state to a position space further apart from leg 13 to accommodate handle portion 5 at the open end of the U-shaped spring 14 through which handle lever 9 projects. This causes the spring to assume a substantially U-shaped configuration in order to accommodate the assemblage. This tensioning of spring 14 following assembly also causes leg 13 to bear upwardly against the bottom of socket portion 4.

Arranged on the upper surface of cover 2 are a pair of stops 23 and 24 aligned with lugs 16 and 17 of handle portion 5, so that, in the downward or locked position of the handle, these lugs lie in the plane of rotation of stops 23 and 24. Unless handle lever 9 is raised sufficiently to permit lugs 16 and 17 to clear stops 23 and 24 before attempting to rotate the handle, these stops will interfere with lugs 16 and 17 and accordingly lock the handle mechanism against rotation.

In the various Figs., the angle cock valve member is assumed to be in an open position. In this open position, handle portion 7 is rotatably positioned with lugs 16 and 17 aligned so as to engage stops 23 and 24 when the handle lever 9 is attempted to be rotated in either direction, without first lifting handle lever 9 against the force of spring 14. Consequently, the handle mechanism is locked against rotation and may be unlocked to permit rotation out of the open position of the angle cock valve member by pulling handle lever 9 upward with a force sufficient to overcome the opposing force of spring 14. Due to the fact that the radius 22 is greater than radius 20, leg 21 of spring 14 will tend to deflect without any substantial deflection of leg 13 and base 19 through the arc of rotation of handle lever 9 during raising thereof. In the raised position of handle lever 9, the handle mechanism is unlocked and free to be rotated horizontally by reason of handle lugs 16 and 17 clearing stops 23 and 24 as the handle lever is rotated.

A tang 25 projects from the side of socket portion 4 opposite lug 11 into a slotted pocket 26 formed in the circular body of handle portion 5. Thus, rotation of handle portion 5 acting through the pivotal connection with socket portion 4 at the bifurcated boss 10 and at the slotted pocket 26 transmits the horizontal rotary handle force to socket portion 4 and accordingly via operating stem 7 to the angle cock valve member.

A stop 27 is formed on the upper surface of cover 2 intermediate stops 23 and 24. Stop 27 cooperates with stop 24 to form a quadrant between which tang 25 is operative in the horizontal plane to limit the angle of rotation of socket portion 4, even though handle lever 9 is raised to unlock the handle mechanism. When handle lever 9 is rotated approximately 90° in a counterclockwise direction from the open position of the angle cock valve member, tang 25 engages stop 27 and prevents any further rotation to thereby establish the closed position of the valve member.

In the closed position of the valve member, handle lug 16 is aligned with stop 27 in substantially the same relative angular disposition therewith as tang 25 had in the open position of the valve member. Upon releasing handle portion 5 in this closed position of the angle cock valve member, spring 14 bearing downwardly on handle portion 5 is effective to force the handle lever to its locked position in which locking lug 16 lies in the plane of rotation of stop 27. Thus, the handle mechanism in this closed position of the valve member is prevented from rotation in a clockwise direction by engagement of lug 16 with stop 27 and from rotation in a counterclockwise direction by engagement of handle tang 25 with stop 17.

It will be appreciated at this point that, during the foregoing rotation of the valve member from an open position to a closed position, spring 14 is assured of rotating with the handle mechanism by reason of the enlarged end 15 of leg 13 having sides conforming in shape and being engagable with the inner face of lugs 16 and 17, even in the raised or unlocked position of handle lever 9. The sides of leg 13 are straight, so that, as the handle is rotated, these handle locking lugs rotate leg 13 with the handle. Thus, leg 21 of spring 14, which bears downwardly on handle portion 7, is assured of rotating with the handle portion throughout the rotation of handle lever 9, without the likelihood of being twisted out of position.

It should also be appreciated that, during rotation of spring 14 with the handle mechanism, the spring is permitted to rotate without engagement of leg 13 with the cover 2, due to the diameter of circular opening 18 at the enlarged end 15 of leg 13 being greater than the diameter of cover 2.

It will be further appreciated that the radius 22 forming the angle between base 19 and leg 21 of spring 14 is greater than the radius forming the angle between base 19 and leg 13. This arrangement assures that the deflection of spring 14 when handle lever 9 is raised occurs primarily through leg 21, while the angular relationship between base 19 and leg 13 remains relatively constant. Consequently, leg 13 serves the main purpose of securing spring 14 in place for rotation with handle 9, while leg 21 acts like a leaf spring in providing the locking tension on handle lever 9. In addition, the spring load on handle lever 9 tends to overcome handle vibration, thus assuring a longer service life of the handle components, such as pivot pin 12.

Accordingly, an improved spring-locking handle mechanism is provided, which can be achieved by modifying a conventional self-locking style handle mechanism by the addition of a low-cost spring device in a manner which gives reliable operation over a long service period without requiring any special maintenance or special tools to assemble.

Having now described the invention what we claim as new and desire to secure by Letters Patent, is:

1. For use with a locking-type handle including a socket portion and a handle portion connected to said socket portion connected to control means so that said handle portion is rotatable relative to said socket portion in a first plane of rotation between a locked and an unlocked position, and rotatable with said socket portion in a second plane of rotation between an open and a closed position to effect operation of said control means following operation of said handle portion in said first plane of rotation to said unlocked position, a flat spring having a generally U-shaped configuration comprising:
 (a) a first leg bearing against the underside of said socket portion; and
 (b) a second leg overlying the socket portion and bearing against the upper side of said handle portion so as to exert a yieldable force thereon twoward said locked position, said force increasing with operation of said handle portion toward said unlocked position.

2. A spring, as recited in claim 1, wherein said spring is preformed by bending so as to include a base between said first and second legs, the included angle between said base and said first leg and between said base and said second leg being such that said legs converge.

3. A spring, as recited in claim 2, wherein said included angle between said base and said first leg is greater than the included angle between said base and said second leg.

4. A spring, as recited in claim 3, wherein said first leg is bent at an angle substantially 90° relative to said base.

5. A spring, as recited in claim 1, wherein said first leg is provided with an opening therein.

6. A spring, as recited in claim 5, wherein the width of said first leg is enlarged at the end thereof, said opening being provided at said enlarged end.

7. A locking-type handle mechanism for operating a valve member housed in a body, said handle mechanism comprising:
 (a) a socket portion rotatably fixed to said valve member;
 (b) a handle portion having means cooperating with said socket portion for providing free movement of said handle portion relative to said socket portion in a second plane of rotation between a locked position and an unlocked position and for transmitting movement of said handle portion to said socket portion in a second plane of rotation following operation of said handle portion to said unlocked position to permit operation of said valve member;
 (c) at least one locking lug on said handle portion;
 (d) stop means on said body engagable with said at least one locking lug in said locked position for preventing said movement of said handle portion in said first plane of rotation; and
 (e) spring means for exerting a yieldable force on said handle portion toward said locked position comprising a flat spring having a generally U-shaped configuration, with one leg thereof bearing against the underside of said socket portion and the other leg overlying the socket portion bearing against the upper side of said handle portion, whereby said movement of said handle portion in said second plane of rotation from said locked position toward said unlocked position effects a spreading action between said one and said other legs to thereby increase the yieldable force urging said handle portion toward said locked position.

8. A locking-type handle, as recited in claim 7, wherein said at least one locking lug comprises a pair of spaced-apart locking lugs, said one leg of said spring means being interposed between said spaced-apart locking lugs for movement therewith when said handle portion is moved in said second plane of rotation.

9. A locking-type handle, as recited in claim 8, wherein the width of said one leg between said sides thereof corresponds to the distance between the adjacent faces of respective ones of said locking lugs.

10. A locking-type handle, as recited in claim 9, wherein said sides of said one leg conform in shape with the shape of said adjacent faces of said locking lugs.

11. A locking-type handle, as recited in claim 10, wherein said sides of said one leg are straight.

12. A locking-type handle, as recited in claim 11, wherein said one leg of said spring means is provided with an opening therein.

13. A locking-type handle, as recited in claim 12, wherein said opening in said one leg lies substantially between said sides thereof.

14. A locking-type handle, as recited in claim 12, further comprising:
 (a) a cover of said body having an opening therein; and
 (b) a stem of said valve member via which said socket portion is rotatably fixed to said valve member, said stem projecting through said opening in said cover and said opening in said one leg of said spring means.

15. A locking-type handle, as recited in claim 14, wherein said opening in said one leg of said spring means is circular.

16. A locking-type handle, as recited in claim 15, wherein the external circular diameter of said cover is greater than the diameter of said opening in said one leg of said spring means.

17. A locking-type handle, as recited in claim 7, wherein said spring is preformed by bending so as to include a base between said one leg and said other leg, the included angle between said base and said one leg and between said base and said other leg being such that said legs converge.

18. A locking-type handle, as recited in claim 17, wherein said included angle between said base and said one leg is greater than the included angle between said base and said other leg.

19. A locking-type handle, as recited in claim 18, wherein said one leg of said spring means is bent at an angle substantially 90° relative to said base.

20. A locking-type handle, as recited in claim 19, wherein said one leg of said spring means is provided with an opening therein.

21. A locking-type handle, as recited in claim 20, wherein the width of said one leg is enlarged at the end thereof, said opening being provided at said enlarged end.

22. A locking-type handle, as recited in claim 21, further comprising:
 (a) a cover of said body having an opening therein; and
 (b) a stem of said valve member via which said socket portion is rotatably fixed to said valve member, said stem projecting through said opening in said cover and said opening in said one leg of said spring means.

23. A locking-type handle, as recited in claim 22, wherein said opening in said one leg of said spring means is circular.

24. A locking-type handle, as recited in claim 18, wherein said included angle between said base and said other leg is greater following assembly of said spring means than in said preformed condition of said spring, thereby developing tension in said spring to provide said yieldable force on said handle portion.

25. A locking-type handle, as recited in claim 18, wherein the radius of the included angle between said base and said one leg is less than the radius of the included angle between said base and said other leg.

26. A locking-type handle, as recited in claim 25, wherein said included angle between said base and said other leg is greater following assembly of said spring means than in said preformed condition of said spring, thereby developing tension in said spring to provide said yieldable force on said handle portion.

* * * * *